United States Patent
Fromm

(10) Patent No.: US 6,266,640 B1
(45) Date of Patent: *Jul. 24, 2001

(54) DATA NETWORK WITH VOICE VERIFICATION MEANS

(75) Inventor: Laurence J. Fromm, Rockaway, NJ (US)

(73) Assignee: Dialogic Corporation, Parsippany, NJ (US)

( * ) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 0 days.

(21) Appl. No.: 08/692,619

(22) Filed: Aug. 6, 1996

(51) Int. Cl.⁷ .................................................. G10L 17/00
(52) U.S. Cl. ........................... 704/273; 704/246; 235/380
(58) Field of Search .................................... 395/2.79, 2.8, 395/2.81, 2.82, 2.83, 2.84; 380/25; 705/23; 379/91.01; 704/246; 235/380

(56) References Cited

U.S. PATENT DOCUMENTS

| | | | |
|---|---|---|---|
| 5,216,720 | * | 6/1993 | Naik et al. ............................ 395/2.82 |
| 5,335,276 | * | 8/1994 | Thompson et al. .................. 395/2.82 |
| 5,339,361 | * | 8/1994 | Schwalm et al. ....................... 380/23 |
| 5,465,401 | * | 11/1995 | Thompson ............................. 455/89 |
| 5,594,789 | * | 1/1997 | Seazholtz et al. ................... 395/2.82 |
| 5,655,007 | * | 8/1997 | McAllister ........................ 379/91.01 |
| 5,794,207 | * | 8/1998 | Walker et al. .......................... 705/23 |
| 5,862,223 | * | 1/1999 | Walker et al. .......................... 380/25 |
| 6,101,242 | * | 8/2000 | McAllister et al. .............. 379/88.02 |
| 6,122,357 | * | 9/2000 | Farris et al. .......................... 379/207 |

\* cited by examiner

*Primary Examiner*—Richemond Dorvil
*Assistant Examiner*—Susan Wieland
(74) *Attorney, Agent, or Firm*—Kaplan & Gilman, L.L.P.

(57) ABSTRACT

A technique for verifying a user's voice prior to permitting the user to conduct a business transaction over a data network. An order is received via the data network, and a voice verification unit is contacted to (i) access a prestored voice print, (ii) obtain a present voice sample from the consumer desiring the transaction and compare said present voice sample to the prestored voice sample, and (iii) issue a signal indicating whether the voice correctly verifies.

18 Claims, 2 Drawing Sheets

20# DATA NETWORK WITH VOICE VERIFICATION MEANS

TECHNICAL FIELD

This invention relates to data authentication, and more particularly, to an improved technique of verifying the identity of a user of a data network.

BACKGROUND OF THE INVENTION

The use of electronic mail, data networks, and other electronic communications has become widespread over the past several years. More and more businesses and individuals are becoming connected to data networks, such as the internet, in order to communicate information in a paperless manner.

The growth in data network use has recently led to a wide variety of goods and services being offered to consumers who use such data networks. For example, many magazines are now available on line, airline tickets can be booked electronically, etc.

One general category of available online services is consumer transactions. Consumers may purchase items by entering an account number to be billed, credit card, etc. The consumer can thus place an order for an item to be delivered to a specified location.

One issue of concern is security, and more particularly, authentication. Specifically, the widespread use of data networks leaves open the possibility of theft of credit card numbers, passwords, and other information which a dishonest individual can use to charge purchases to the account numbers of others.

While numerous technologies for encryption and cryptographic authentication exist, these technologies include several drawbacks. One such drawback is that the encryption usually involves a cryptographic key, and management and record keeping with respect to all of the different keys is not a simple task. Moreover, some sophisticated mathematical algorithms exist which can decipher the cryptographic information, even without advance knowledge of the cryptographic key. Finally, a clever thief may have a technique to steal the cryptographic key, just as he may have a technique to steal the password previously utilized with a particular user, account number, etc. Accordingly, the encryption technique is not completely reliable.

In view of the above, it can be appreciated that there exists a need in the art for an improved technique of verifying a particular user's identity before accepting payment from that user or dispatching any goods or services to that user, in order to ensure that the payment is not being sent from a stolen credit card number or other account number.

SUMMARY OF THE INVENTION

The above and other problems of the prior art are overcome in accordance with the present invention which relates to a technique of verifying the user's identity by use of a voice print before allowing the user to engage in commercial transactions over the data network. In accordance with one embodiment of the invention, a voice verification unit is connected to the data network. The user's ID is ascertained by means of, for example, his data network address, and his stored voice print is retrieved from a voice print bank. The user is then asked to speak a few words, in order to verify the user's identity. The verification of the user's speech pattern may take place with the aid of a separate telephone call initiated by either the voice verification unit or the user's computer and/or telephone, or by the computer accepting and processing the transaction. The verification may take place by transmitting the voice in digital form over the data network.

DETAILED DESCRIPTION OF THE PREFERRED EMBODIMENT

Figure 1:
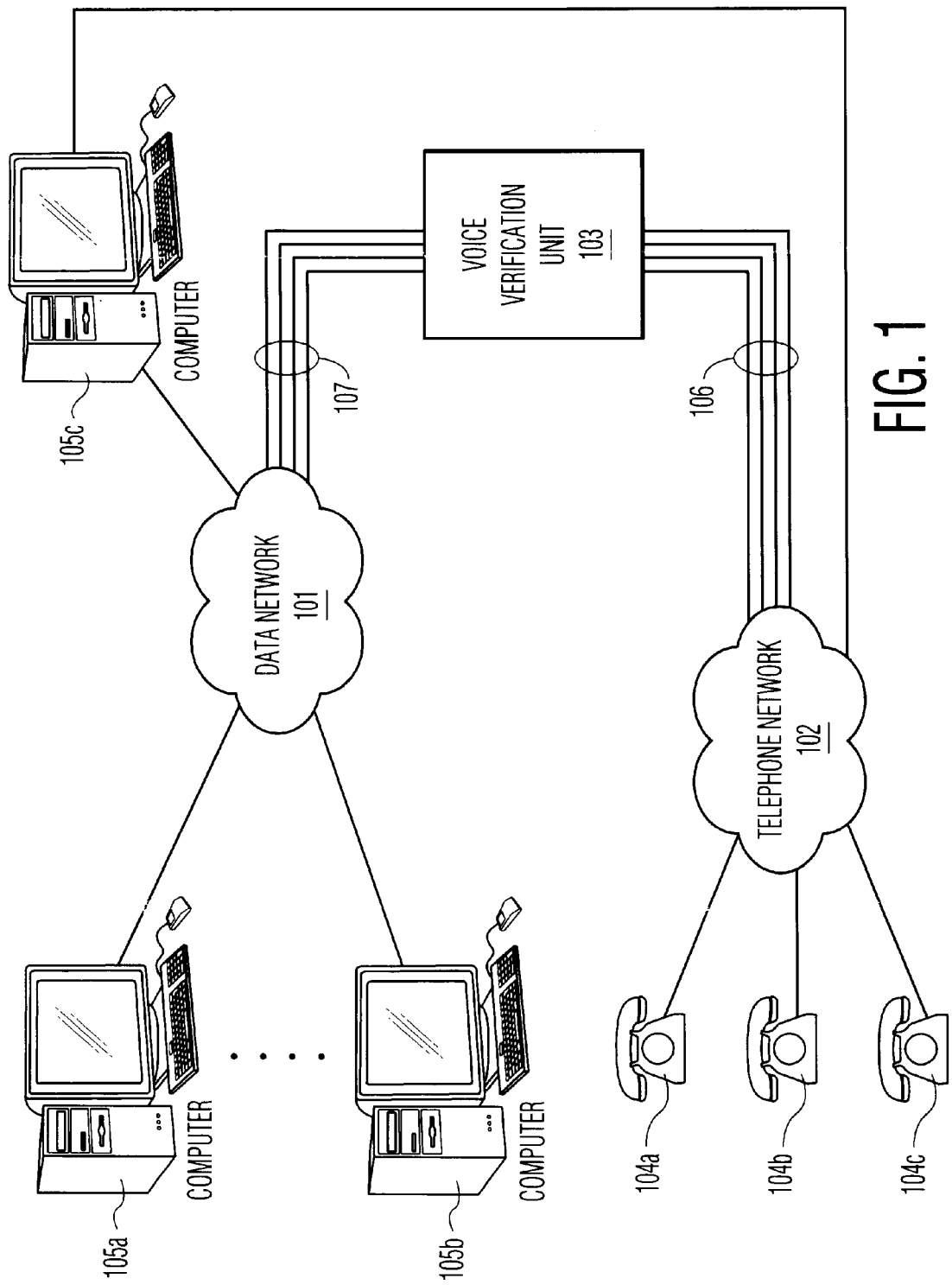
FIG. 1 shows portions of a voice network and a data network, both connected to a voice verification unit in accordance with the present invention.

FIG. 1 shows a conceptual diagram of an exemplary embodiment of the invention including a voice verification unit 103 connected to a data network 101 and a voice network 102. As shown in FIG. 1, the data network 101 includes a plurality of computers 105 and a plurality of telephones 104, several of which are shown.

Lines 107 are shown as connecting the voice verification unit 103 to the data network 101, while lines 106 are indicated as connecting the voice verification unit to the telephone network 102. It is noted that each of the networks 101 and 102 is shown separately. However, as is known to those of ordinary skill in the telecommunications art, computers 105 and voice verification unit 103 may connect to the data network by utilizing a portion of the telephone network and a modem. The networks are shown separate, and are separate logical networks, but are not intended to be entirely physically separate.

The difference between the networks is effectively the set of addresses used to address each terminal. Specifically, each connection to the data network has a particular logical address with a specific name, while each connection to the telephone network has a particular logical address with a specific telephone number.

As is also known in the art, a user of computer 105 may access the data network, as well as other computers connected to the data network, from many different telephone numbers, but the address on the data network will be the same, irrespective of from which telephone number said data network is entered. Additionally, a single particular telephone line may be utilized, at different times, to provide access to the data network for data network users that have different logical addresses. Accordingly, the networks are logically separate in terms of their different sets of address spaces, even though there may be some physical overlap between the two networks 101 and 102.

Voice verification unit 103, which will be described more fully hereafter, is utilized in order to provide security when a user of the data network 105 engages in a commercial transaction via the data network 101. Voice verification unit 103 may communicate with computers 105 and or telephone terminals 104, as one or both may be necessary for the performance of the functionality of voice verification unit 103 as set forth hereafter.

Consider an exemplary transaction whereby a user of computer 105a is desirous of purchasing a service from a vendor. The vendor operates computer 105c. Additionally, each user of data network 101 is known to the data network 101 as a predetermined logical address. Such an arrangement is typical of the internet, where all users must register their internet domain name.

In one exemplary mode of operation, the user's voice is stored in advance of the transaction at the storage unit of voice verification unit 103. This storage may take place, for example, when the user first registers with the data network to obtain the user's logical address. For example, when the internet domain name is entered, a live operator or voice processing system could be utilized to accept a voice print of predetermined duration or words. Details of how to accomplish this are described later herein.

Presuming the voice is prestored at the voice verification unit, when a user of computer 105*a* desires to engage in a purchase from a vendor that operates computer 105*c*, the user of computer 105*a* transmits the relevant ordering information and payment method. The payment method could be, for example, either a bank account number or credit card number. Alternatively, a deposit account could be established when the user's voice is registered at VVU 103.

The computer 105*c* must verify the user's voice prior to allowing the transaction. In order to accomplish such verification, computer 105*c* transmits the user's logical address for data network 101 to voice verification unit 103 in accordance with standard data transmission techniques of protocols utilized in data network 101. Voice verification unit 103 then maps the received logical address to the prestored voice print and reads the prestored voice print into its working memory.

The next task for voice verification unit 103 is to obtain a present sample of the user's voice. One exemplary technique for accomplishing this is for voice verification unit 103 to call the user on a predetermined, or user specified, telephone number through telephone network 102 and prompt the user to speak particular words into the telephone. Other techniques are also described later herein.

An alternative technique, if the user's computer 105*a* has a microphone, is for the user to input his voice print at computer 105*a* when he places the order. For example, computer 105*c* could transmit a message to computer 105*a*, in response to the order from computer 105*a*. The message, which would be displayed on the screen of the user's computer, would read "Please speak the following words into your computer's microphone . . . " or "Please speak your password into your computer's microphone." By utilizing a password in conjunction with voice verification, two levels of security are provided. Computer 105*c* would then transmit the logical address of computer 105*a*, along with the acquired voice, to voice verification unit 103. The voice could then be sent over the data network, in digital form, in accordance with known techniques.

In any event, regardless of the protocol used to obtain the present voice sample, voice verification unit 103 compares the voice acquired at transaction time to the prestored voice, and returns to computer 105*c* a signal indicating acceptance or rejection of the voice comparison.

Figure 2:
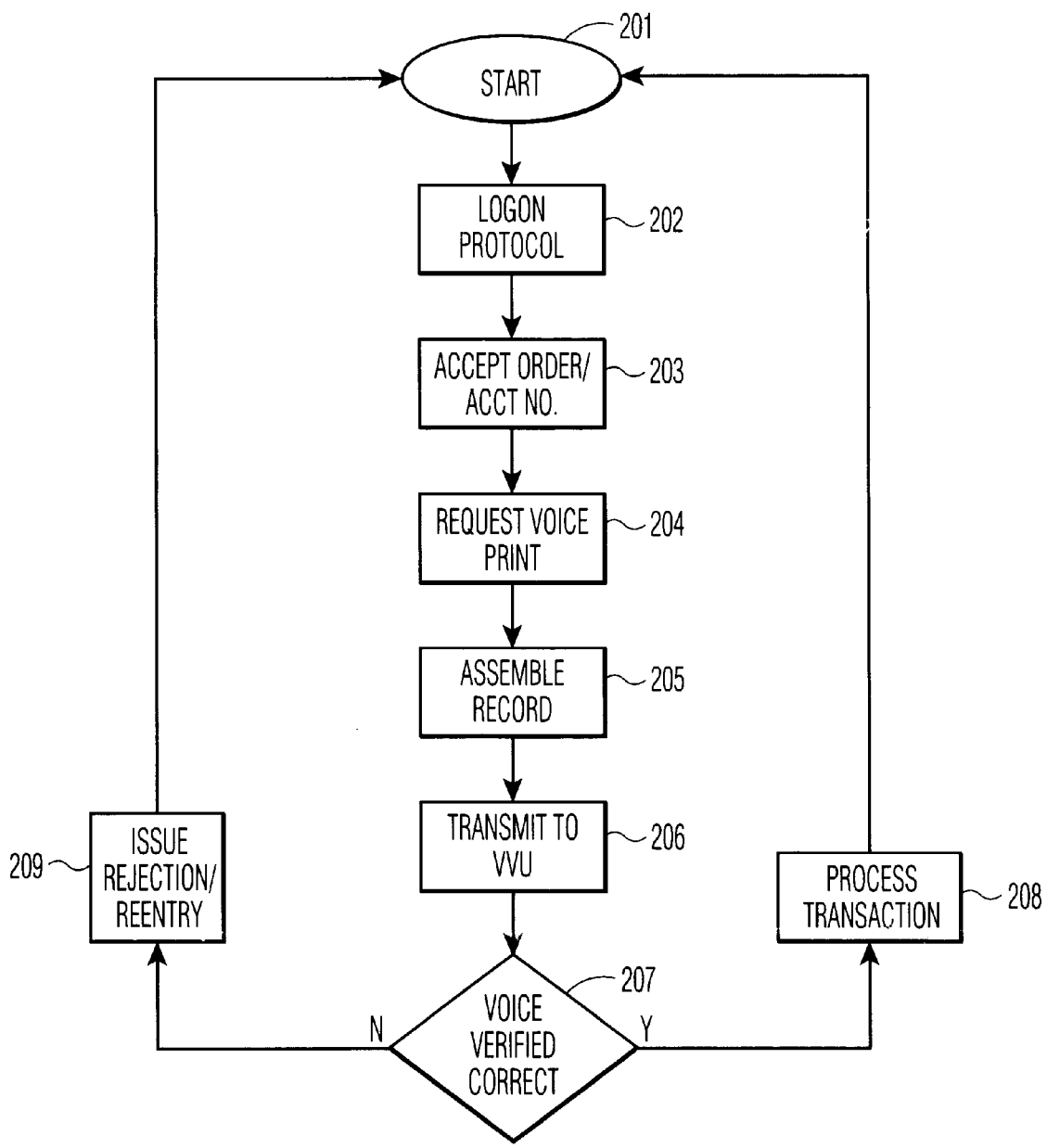
FIG. 2 shows a flow chart for implementing the basic steps necessary for practice of the present invention.

FIG. 2 shows a conceptual flow chart of the steps to be executed by computer 105*c* operated by the inventor. After start 201, the logon protocol is executed at block 202. Logon protocol is any standard protocol which, for example, may require the user to enter a password, or any other relevant information. The user then orders a particular service or product at block 203, which order includes an appropriate account number to which charges should be made. The account number may be a bank account number, credit card number, or other information.

Prior to filling such order, the voice sample is requested at block 204. The voice sample may be requested in one of several ways. One technique is to print a message on the user's terminal requiring the user to call a particular telephone number. Included in such a message is an identification number ("transaction ID") which uniquely identifies the transaction. The transaction ID is similar to a purchase order number. The transaction ID may be generated, for example, by utilizing a hashing operation to act upon the data related to the transaction, although other methods may be used as well.

The transaction ID is utilized in order to be able to pair the voice sample entered at the time of transaction with the prestored voice sample. In one simple embodiment, the transaction ID may be the user's data network address.

A message would be sent to the user's terminal, stating something such as "Please call 1-800-123-4567. Enter transaction ID ABCD, and speak your password . . . " The 800 number connects the consumer's telephone to computer 105*c*.

Upon receipt of the telephone call, the computer 105*c* receives the current voice sample and pairs the current voice sample with the particular transaction in question, based upon the transaction ID, in order to connect the current voice sample with the particular user. Alternatively, the pairing of the voice sample with the transaction may be based upon either the user's data network address or upon his logon password. The record containing the voice sample and other information may then be sent to the voice verification unit at step 206.

Alternatively, rather than having the voice sample taken at computer 105*c*, computer 105*c* could transmit the message to computer 105*a* while at the same time transmitting, via data network 109, the transaction ID to the voice verification unit 103. The voice verification unit 103 would then receive the toll free telephone call, or may receive the voice sample from the data network 101, from the user. Of course, the voice verification unit 103 could place the call as well. Voice verification unit 103 may then verify the voice received. Voice verification unit 103 could then send the approval with the transaction ID or data network logical address back to computer 105*c*.

In any of the above cases, subsequent to the voice sample being received from the consumer, block 205 transmits the appropriate information from computer 105*c* to voice verification unit 103. The information may include the transaction entered by the user during a telephone call, as well as the voice sample. Alternatively, if the voice sample was received directly at the voice verification unit 103, then the record would include only the transaction ID so that the voice verification unit could match the transaction ID received from the user with that generated by computer 105*c*.

In any event, the assembled record is transmitted at block 206 to the voice verification unit 103 for processing. At block 207, the voice verification unit sends the appropriate answer back to computer 104. If the voice is verified as correct, then the transaction is processed at block 208. As also shown in FIG. 2, if the voice is not verified as correct, then the transaction is rejected, or alternatively, the user may be asked to reinput the voice sample, just in case the first sample was inappropriately corrupted.

In addition to the above, other embodiment for obtaining a present voice sample and comparing it to a stored voice print are possible. For example, the prestored voice sample could be a chosen password. The voice verification unit, when prompting the user to enter his voice, could cause a message to be displayed on the user's terminal stating "Please speak your password." Such a system adds an extra level of security by requiring any potential intruder to not only be able to imitate a party's voice, but to know the password. Additionally, should a party enter the correct password with the incorrect voice a predetermined number of times, the system could recognize a potential theft of the password and take a desired action such as prompting the user to change the password.

The voice verification unit may not be certain from which telephone number the user is accessing computer 105c. Accordingly, VVU 103 could display on computer 105a a message sating "Please input a telephone number at which you can be reached, or enter ### if you can not be called." Thereafter, the user will be called and prompted for a voice sample, or, if he entered ###, will be given a predetermined time, say two hours, to call the VVU 103 and enter a voice sample. If the user made the call within the two hours, he would be required. Otherwise, the transaction will be cancelled.

The VVU 103 could be combined with, or made part of, computer 105c. Specifically, each transaction computer can have its won database of voice prints, or the voice prints can be centrally stored in VVU 103. Alternatively, the VVU 103 could store all the voice prints and simply forward them to computer 105c for processing and/or comparison.

The circuitry required to implement the voice and data recognition functions is well known to those of ordinary skill in the art and will not be described in detail herein. Suffice to say that a typical PC based voice processing system may be utilized at both voice verification unit 103, and as part of computer 105c.

With regard to obtaining the voice print for storage at the voice verification unit 103, one possible protocol recognizes the user's initial logon. Specifically, when the user logs on for the first time, the system connects him to the voice verification unit. The applications program in the voice verification unit sends a prompt message to the computer 105. The prompt message is displayed on the screen requesting that the user enter his or her voice. The voice is then stored in voice recognition unit 103, along with an associated user ID or password.

It is understood that while the above describes the preferred embodiments of the invention, various other modifications may be made without departing from the spirit or scope hereof. One enhancement involves taking into account the fact that verification algorithm may return a level of certainty rather than a binary digit. The system could allow transactions to occur if, for example, the VVU 103 returns an answer indicating that there is at least an 80% likelihood that the user is authentic. Different levels of certainty could be required for different monetary levels of transactions.

The voice print can be obtained by a data network or telephone network connection, either of which can be initiated by computer 105a, computer 105c, or VVU 103. It is also possible to utilize characteristics other than voice, such as fingerprints, retina characteristics, or other properties which are unique to an individual.

Other variations involve allocating one or more of the computing functions discussed above in the same or different computers. Specifically, one can view the described system as having the following four computing functions: (i) transaction function, for accepting a consumer transaction (ii) an acquisition function, for acquiring a present voice sample to verify before allowing the transaction (iii) a storage function, for storing samples of numerous previously obtained voice prints to be used for comparison and verification during transactions, and (iv) a comparison function for comparing the voice sample obtained during the transaction to the previously stored voice print.

The embodiment shown in FIG. 1 hereof contemplates two computers 105c and 103 which implement all four functions. However, it is possible to allocate the four functions differently, and among any number of computers. For example, the transaction computer 105c could include a copy-of all voice prints of authorized users. Upon a transaction occurring, computer 105c could acquire a present voice sample and verify the sample against a previously stored voice print prior to allowing the transaction. In such an embodiment, all four of the functions discussed above are implemented in computer 105c, and the separate voice verification hardware is eliminated. Other embodiments are possible as well.

The above describes the preferred embodiments of the invention. It is understood however, that various other modifications and additions will be apparent to those of ordinary skill in the art.

What is claimed is:

1. A method of consummating a transaction over a data network in a system having a consumer computer, a transaction computer and a voice verification unit, comprising:

generating a transaction identification number which is uniquely associated with a transaction desired to be consummated between said transaction computer and a user of said consumer computer, said transaction identification number comprising a user ID of said user;

establishing a data network connection from said transaction computer to said voice verification unit, and transmitting said transaction identification number from said transaction computer to said voice verification unit over said data network;

requesting said user to provide a voice sample;

receiving, at said voice verification unit, said voice sample entered by said user, said voice sample being associated with said transaction identification number;

verifying said voice sample, at said voice verification unit, by comparing it to a pre-stored voice print of said user identified by said user ID;

transmitting a verification signal along with said transaction identification number from said voice verification unit to said transaction computer over said data network; and consummating said transaction only if said voice sample is verified to be correct.

2. The method of claim 1 wherein said voice sample is provided by said user to said transaction computer.

3. The method of claim 2 wherein said voice sample is transmitted along with said transaction identification number from said transaction computer to said voice verification unit.

4. The method of claim 1 wherein said voice sample is provided by said user directly to said voice verification unit.

5. The method of claim 1 wherein said step of requesting is generated by said transaction computer by displaying a message on said consumer computer along with a telephone number which said user shall call to provide said voice sample over telephone.

6. The method of claim 5 wherein said telephone number is that of said transaction computer.

7. The method of claim 5 wherein said telephone number is that of said voice verification unit.

8. The method of claim 1 wherein said step of requesting is venerated by said voice verification unit by calling said user on a telephone and prompting said user for said voice sample.

9. The method of claim 1 wherein said transaction identification number is generated by said transaction computer.

10. The method of claim 1 wherein said transaction identification number further comprises identification information of said transaction computer.

11. A system for consummating a transaction, comprising:

a consumer computer;

a transaction computer for receiving a transaction request from a user of said consumer computer, said user having a unique user ID;

means for generating a transaction identification number for said transaction requested by said user, said transaction identification number comprising said user ID;

means for sending said transaction ID to a voice verification unit;

means for requesting said user to provide a voice sample;

means for receiving said voice sample provided by said user; and said voice verification unit comprising a voice print bank for pre-storing a voice print of said user tagged by said user ID, means for verifying said voice sample of said user by comparing said voice sample with said pre-stored voice print of said user, and means for transmitting a verification signal along with said transaction identification number to said transaction computer over said data network;

wherein said transaction computer and said voice verification unit are connected to a data network with separate addresses via said network and are communicable to each other over said data network.

12. The system of claim 11 wherein said transaction computer comprises said means for generating said transaction identification number and means for sending said transaction identification number to said voice verification unit.

13. The system of claim 11 wherein said voice verification unit comprises means for sending a verification signal along with said transaction identification number to said transaction computer.

14. The system of claim 11 wherein said means for requesting said voice sample is implemented by said transaction computer by displaying a request at said consumer computer.

15. The system of claim 14 wherein said request comprises a telephone number which said user shall call to provide said voice sample.

16. The system of claim 15 wherein said telephone number is that of said transaction computer.

17. The system of claim 15 wherein said telephone number is that of said voice verification unit.

18. The system of claim 11 wherein said means for requesting said voice sample is implemented by said voice verification unit by calling said user for said voice sample.

* * * * *